Nov. 2, 1954  F. E. BUSCHBOM  2,693,285
BALE-LOADING DEVICE
Filed Oct. 14, 1949  3 Sheets-Sheet 1
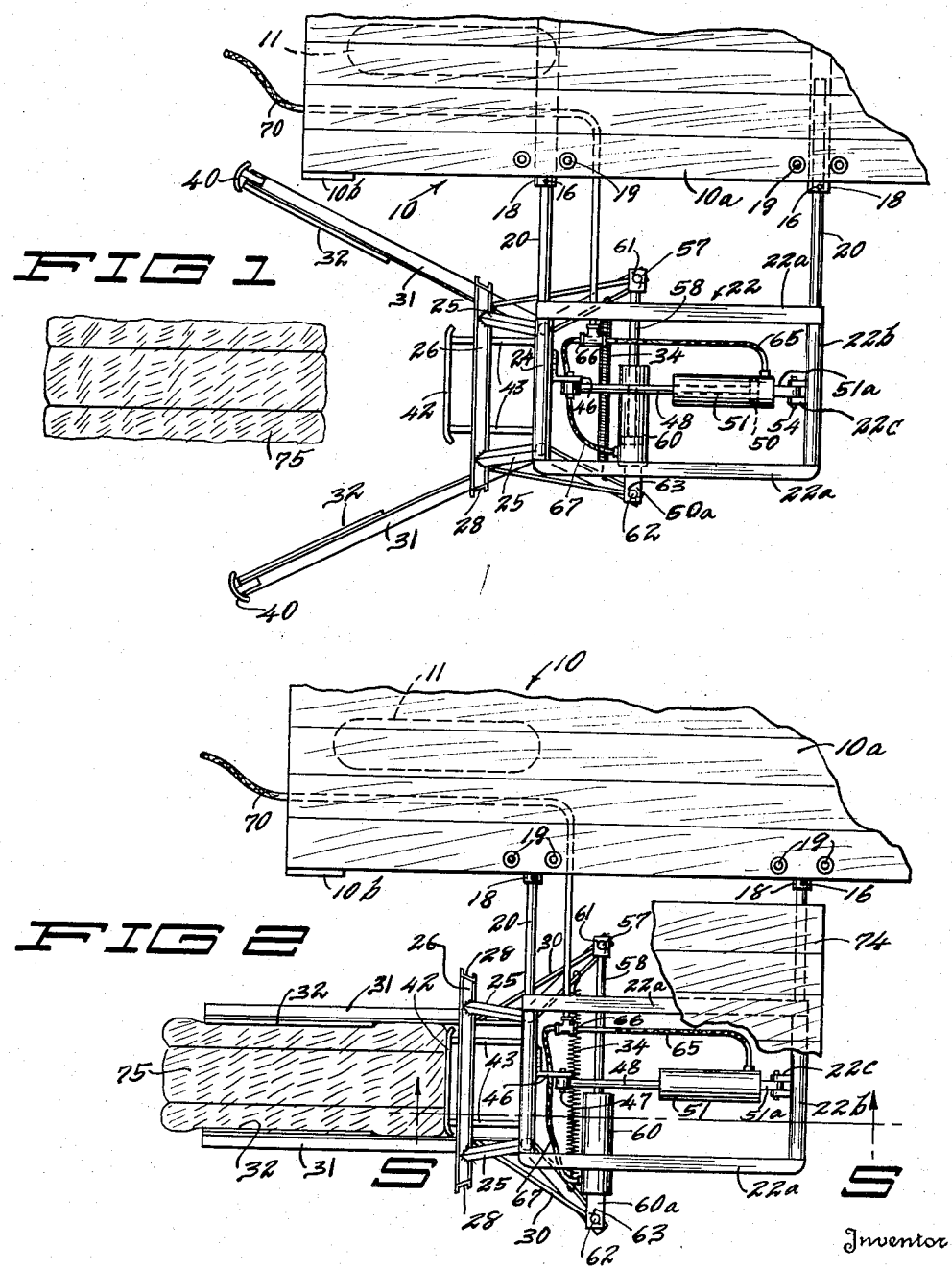
Inventor
FLOYD E. BUSCHBOM
By Chas. C. Reif
ATTORNEY Nov. 2, 1954  F. E. BUSCHBOM  2,693,285
BALE-LOADING DEVICE
Filed Oct. 14, 1949  3 Sheets—Sheet 2
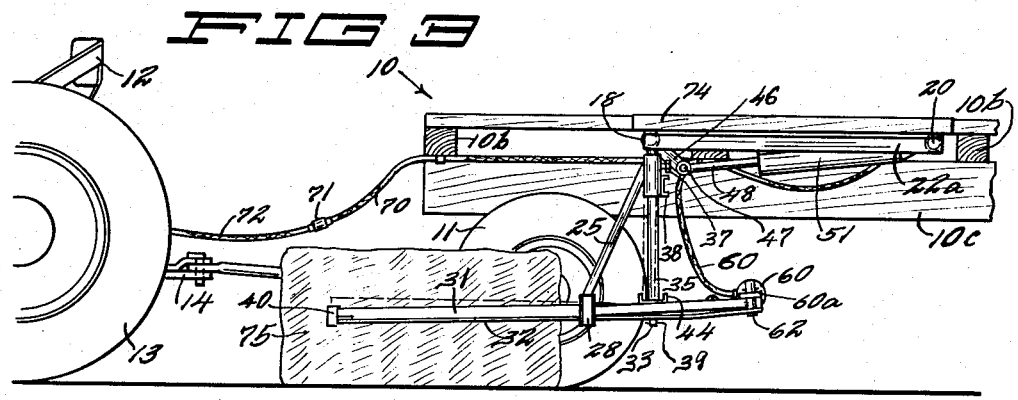
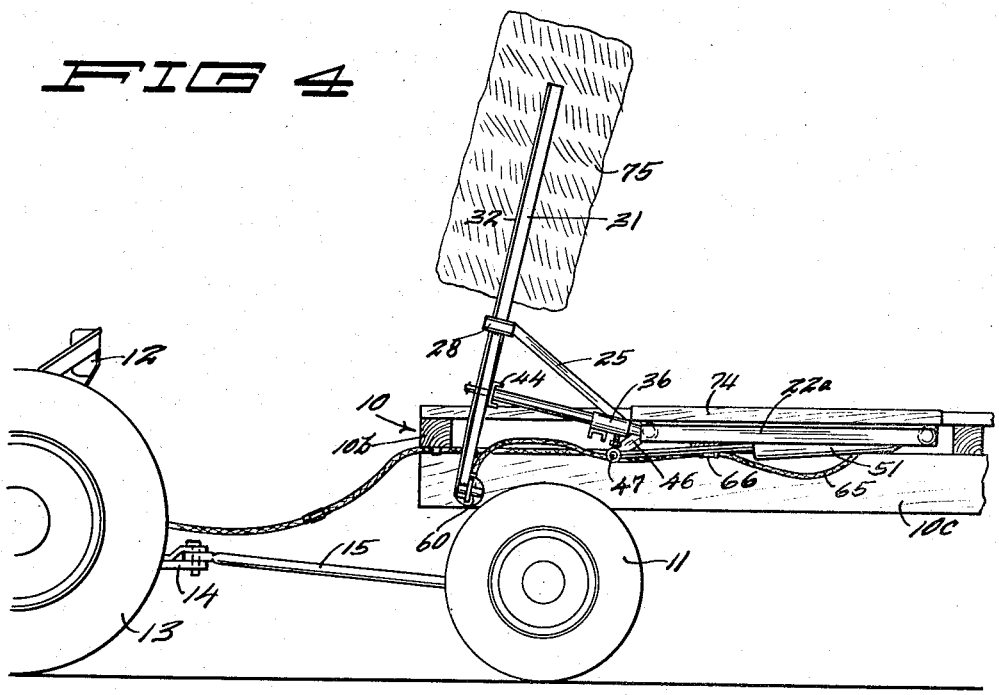
Inventor
Floyd E. Buschbom
By Chas. C. Reyf
Attorney United States Patent Office 2,693,285
Patented Nov. 2, 1954

2,693,285

BALE-LOADING DEVICE

Floyd E. Buschbom, Albert Lea, Minn.

Application October 14, 1949, Serial No. 121,315

18 Claims. (Cl. 214—77)

This invention relates to a bale-loading device and particularly to a bale-loading device adapted to be carried by and moved by a vehicle. This vehicle may be a vehicle adapted to receive the bales and on which the bales are loaded. Said vehicle will ordinarily be drawn by a tractor or other traction device.

There have been machines for picking up the bales, in the prior art, and the ordinary practice has been as follows:

The bales of hay are left on the ground by the balers. In the operation of loading these bales on a vehicle, one man would drive the vehicle, another would stand on the vehicle and load the bales, and a third would walk along the ground and lift the bales of hay into position where the loader used could take them and move them to discharging position on the vehicle. The present invention operates so that the services of the man on the ground are not needed and are dispensed with. The bales are loaded just as quickly and in a better manner and the laborious job of lifting the bale to place it in position for the loader is eliminated.

It is an object of the invention to provide a bale-loading device carried by and movable by a vehicle, which device has means to engage the sides of the bale to thus firmly grasp the bale, and which also has means for swinging said first mentioned means and bale upwardly to bring the bale to discharging position.

It is another object of the invention to provide such a device as set forth in the preceding paragraph in which fluid under pressure supplied by the tractor vehicle is used to cause the bale-engaging member to grasp the bale and to swing said bale-engaging members and bale upwardly.

It is a further object of the invention to provide a bale-loading device having simple and efficient means by which it can be attached to a vehicle and be disposed at one side thereof, the device comprising a frame, a member oscillatable on said frame about a substantially horizontal axis, a pair of oppositely disposed oscillating bale-engaging members pivoted about spaced substantially vertical axes and carried by said member, together with means for causing said bale-engaging members to engage the sides of a bale, and means for swinging said oscillating member to swing said bale-engaging members and bale upwardly.

It is still another object of the invention to provide a simple and efficient arrangement of fluid operated means for first moving said bale-engaging members together to grasp the bale and then swinging said bale-engaging members and bale upwardly to bring said bale to discharging position.

It is more specifically an object of the invention to provide a bale-loading device adapted to be carried by and moved by a vehicle comprising spaced members extending transversely thereof and secured to said vehicle, members projecting from said members respectively and supporting a frame at one side of said vehicle, a sleeve-like member supported adjacent the forward end of said frame for oscillation about a substantially horizontal axis extending transversely of said frame and vehicle, a pair of vertically spaced members disposed forwardly of and below said member and extending transversely of said frame, a pair of oppositely disposed spaced swinging levers movable between said vertically spaced members and pivoted to swing about substantially vertical axes, means normally connecting the rear ends of said bale-engaging members to swing the same together and cause the forward ends thereof to diverge, a piston rod connected to the rear end of one of said bale-engaging members and having a piston thereon, a cylinder connected to the rear end of the other of said bale-engaging members in which said piston is disposed, a second piston rod secured to said oscillating member and having a piston thereon, a second cylinder pivotally connected to the rear end of said frame in which said second piston is disposed, a conduit connected to said first mentioned cylinder adjacent the connected end thereof, a second conduit connected to said second mentioned cylinder adjacent the connected end thereof, a conduit for supplying fluid under pressure and a T connection to which all of said conduits are connected.

Another object of the invention is to provide a device such as set forth in the preceding paragraph, together with a member disposed between said bale-engaging members and adapted to be engaged by the end of a bale, said member being connected to said oscillating member.

These and other objects and advantages of the invention will be fully set forth in the following description made in connection with the accompanying drawings in which like reference characters refer to similar parts throughout the several views and in which:

Fig. 1 is a plan view of the device and a portion of the vehicle by which it is carried, a bale also being shown;

Fig. 2 is a plan view similar to Fig. 1 showing the parts in a different position;

Fig. 3 is a view in side elevation of the device showing a bale;

Fig. 4 is a view similar to Fig. 3 but showing the parts and bale in different positions;

Figure 5:
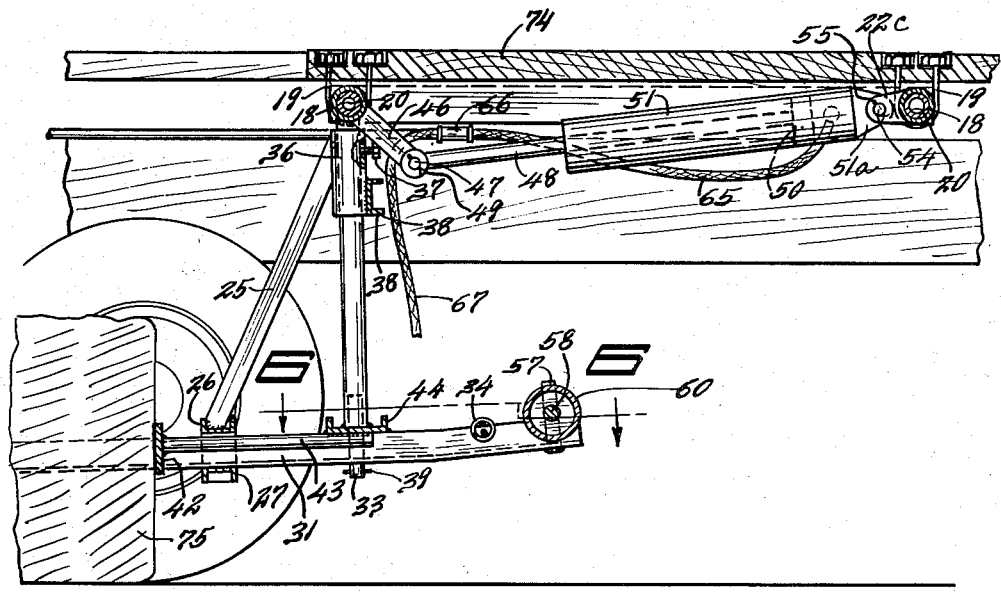
Fig. 5 is a vertical section taken substantially on line 5—5 of Fig. 2, as indicated by the arrows.
Figure 6:
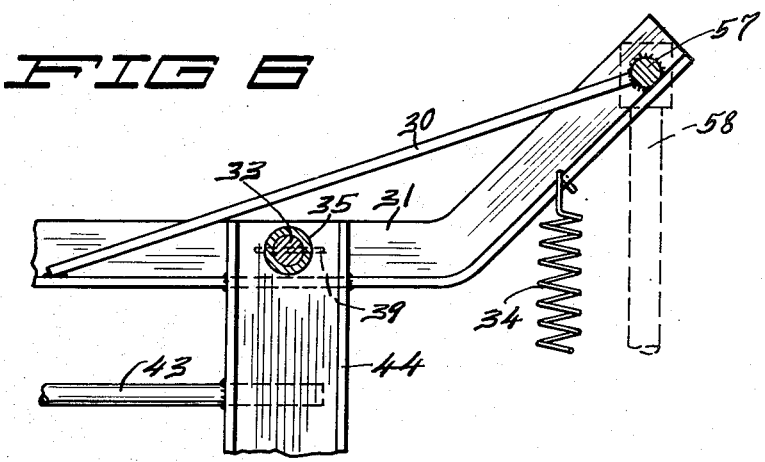
Fig. 6 is a partial horizontal section taken on line 6—6 of Fig. 5 and shown on an enlarged scale.

Referring to the drawings, a vehicle or wagon 10 is shown having a top portion or platform 10a, transversely extending beams or sills 10b and longitudinally extending girders 10c. Said vehicle is supported upon the wheels 11. Ordinarily said vehicle will be drawn by a tractor vehicle 12 supported on the wheels 13, the same having a hitch 14 connected to a tongue or draw bar 15 of vehicle 10.

In accordance with the present invention a pair of supporting members 18 are secured to vehicle 10 beneath the platform 10a and these will be supported by suitable U-bolts 19. While members 18 could take various forms, in practice they have conveniently been made of ordinary iron pipe. Disposed within members 18 and projecting therefrom are the members 20 which can also conveniently be made of piping or metal bars. Headed pins 16 extend through holes in members 18 and 20 and hold the latter in the desired position. A frame 22 comprising spaced longitudinally extending members 22a is supported on members 20, the same having a rear transversely extending member 22b. The forward pipe or bar 20 extends across the front of frame 22. Oscillatably mounted on this forward bar 20 is a member or sleeve 24 and while this could be variously made, in practice it has also been conveniently made of iron or steel piping. A pair of members 25 are secured rigidly to and extend downwardly and somewhat forwardly to a member 26 illustrated as a channel having its flanges directed vertically. A second channel 27 is disposed below and in vertical alignment with channel 26 and the two are connected together by end members or channels 28 which can be welded thereto. As shown, members 28 have their adjacent sides disposed at an acute angle to members 26 and 27. Disposed between and movable between members 26 and 27 are a pair of oppositely disposed levers or bale-engaging members 31. While these members could take any desired form, they are shown as made of angle iron, the same having one flange vertical and the other horizontal. Members 31 have secured thereto and to the vertical adjacent flanges thereof, plates 32. Curved plates 40 are respectively secured to the front ends of bars 31. Members 31 are pivoted to swing about the pivots 33 which have substantially vertical axes and are secured in vertically extending members 35 extending downwardly from a member or sleeve 36 in which they are received and in which they are held by set screws 37. Members 36 are welded or otherwise suitably secured to a transversely extending member 38 which extends transversely between the same. At their upper ends members 35 are secured, as by welding, to the member 24. Pins 39 are shown as extending through the pivot members 33 adjacent their lower ends. A tensile coiled spring 34 has its ends connected to the rear ends of members 31 and tends to draw said rear ends together. From the described construction it will be seen that members 31 are carried by and connected to member 24 and will be swung with member 24 when the same is oscillated.

A bar 42 is provided which extends transversely and substantially horizontally between members 31 and has secured thereto rearwardly extending members or bars 43 which are secured to a transversely extending bar 44, the same being illustrated as a channel and to which the lower ends of members 35 are secured, as by welding. An arm 46 is secured to member 24 in any suitable manner, as by welding, and normally extends downwardly and rearwardly therefrom, the same having an opening at its lower end through which extends a pin 47 connecting arm 46 to the end of a piston or plunger rod 48. Pin 47 is shown as having a cotter pin 49 through the end thereof. Piston rod 48 has secured thereto a plunger or piston 50 which is disposed in a cylinder 51 having a lug 51a at its other end disposed between spaced lugs 22c secured to and projecting forwardly from rear frame member 22b. A headed pin 54 connects lug 51a and lugs 52, a cotter pin 55 being shown as extending through one end of pin 54. Cylinder 51 is thus pivotally connected to end frame member 22b. Pivotally connected to the rear end of one member 31 by a pin 57 is the end of another piston plunger rod 58, the same having secured thereto a piston or plunger 59 disposed in a cylinder 60. Pin 57 is shown as having a cotter pin 61 extending through one end thereof. Brace rods 30 are connected in any suitable manner, as by welding, to pins 57 and members 31. Cylinder 60 has a lug 60a projecting therefrom which is pivotally connected to the rear end of the other member 31 by a headed pin 62, a cotter pin 63 being shown as passing through one end of pin 62. A conduit 65 is connected to cylinder 51 adjacent the connected end thereof, said conduit being connected at its other end to one arm of a T connection or coupling 66. A conduit 67 is connected to cylinder 60 adjacent its connected end and this conduit is also connected to one end of the T connection 66. A conduit 70 for supplying fluid under pressure is connected to the other branch of the T connection 66. The conduit 70 will extend to an automatic shutoff snap coupler 71 to which is also connected a conduit 72 extending to the fluid pump on the tractor vehicle.

If desired a small additional platform 74 could be supported on frame 22 or a part thereof. This, however, is not necessary and is generally not used.

In operation the vehicle 10 will be drawn along the ground by the tractor 12. The bales 75 of hay, straw or other material will be distributed on the ground in the field. These are usually left there by the baling machine. The arms 31 will normally be in their diverging positions, as shown in Fig. 1. The vehicle 10 will be guided so that the arms 31 will move at either side of the bale 75 as the machine advances. Should the bale not be in position with its longitudinal axis substantially parallel to that of the vehicle, the vehicle can be guided so that the bale will be engaged by one of the arms 31 and swung into position to have its sides engaged by the plates 32 on arms 31. Plates 40 are provided to prevent any sharp corner on bars 31 from catching on the bale or binding thereof to prevent injury to the bale. The machine advances and the end of the bale nearest the loader is engaged by bar 42, as shown in Fig. 5. This bar will be moved rearwardly somewhat and will swing members 35, thus swinging or oscillating member 24 and swinging arm 46 rearwardly. This will move plunger rod 48 and its plunger in cylinder 51 so that some pressure will be placed on the fluid in said cylinder. The operator will now apply fluid pressure to the conduits 72 and 70 and pressure is thus applied to the fluid in the T coupling 66. There is some pressure on the fluid in cylinder 51 so the fluid will first flow into the end of cylinder 60. This will move the plunger 59 so that the cylinder and plunger rod 58 move in opposite directions thus swinging the rear ends of arms 31 away from each other and causing the front ends of said arms to approach and to engage the sides of the bale with the plates 32, as shown in Fig. 2. The pressure will build up in cylinder 60 causing the bale to be very firmly grasped or engaged and when the pressure reaches a certain point it will then flow into the rear end of cylinder 51. Piston 50 and piston rod 48 will now be moved forwardly, swinging arm 46, member 24, together with members 25, 26, 27 and the arms 31, thus swinging the bale and arms 31 upward in a clockwise direction to bring the arms 31 and bales 75 into the position shown in Fig. 4. The fluid pressure will now be released by the operator and arms 31 will separate so that the bale can be easily swung onto the platform 10a and it will be moved to the desired position thereon. Usually the bales are loaded in layers or tiers to the desired height. When the fluid pressure is released, the parts will return to the position shown in Figs. 1 and 3.

From the above description it will be seen that I have provided a loader which is quite simple, small in size, light in weight and one which is very easily operated. It will be noted that as described the fluid, such as oil, will successively enter the cylinders 60 and 51 and a separate manual control of each cylinder is thus not necessary. The loader can be very quickly detached by merely separating the coupling 71 which is of the automatic closing type and withdrawing the supporting members 20 from the members 18 after the pins 16 have been removed. There is no part of the device which will catch on the twine or wire with which the bale is bound and said twine or wire will thus not be injured or torn from the bale. The bale is rigidly held by the plates 32 at each side so that it is not bent or distorted in any way while being engaged or loaded. As previously set forth, the loader eliminates or renders unnecessary the use of the man on the ground who has heretofore positioned the bales to be engaged by a loader. In passing through ditches or similar terrain with the tractor and wagon, the fluid can be applied to conduits 72 and 70 so that the arms 31 will be swung up and out of the way to avoid any part of the same from striking the ground. The loader does not project a great distance from the side of the wagon and it is therefore possible to drive the wagon and loader through any standard farm gate without removing the loader. It is convenient to have the members 18 on a number of wagons so that one loader can be readily applied to each wagon while the wagon is being loaded.

The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A bale loading device carried by a vehicle comprising in combination, a frame disposed at one side of said vehicle, means secured to said frame and adapted to be secured to said vehicle to support said frame thereon, a first member on said frame oscillatable about a substantially horizontal axis stationary relative to said frame, a pair of vertically spaced and horizontally extending members extending transversely of said frame and positioned forwardly of said first member, means connecting said pair of vertically spaced members to said first member, a pair of oppositely disposed levers movable between said pair of vertically spaced members, means pivotally securing said levers adjacent their rear ends to said first member whereby said levers are pivoted to swing through a substantially horizontal plane about a substantially vertical axis, said levers extending a distance in front of said frame in normally forwardly diverging relation so as to move into position at either side of a bale, and means for swinging the front portions of said levers together to engage a bale and then oscillating said first member to raise said levers and bale upwardly to bring said bale to discharging position, and for then permitting said levers to swing downwardly in a reverse direction.

2. A bale-loading device adapted to be carried and moved by a vehicle having in combination, a frame secured to said vehicle and disposed at one side thereof, a pair of oppositely disposed elongated bale-engaging members extending forwardly from the front of said frame in normally diverging relation swingable about substantially vertical axes, said members being arranged so as to move into position at either side of a bale, a second member disposed between said members adapted to be engaged by the end of said bale and moved rearwardly thereby, means for moving the rear ends of said bale-engaging members together to cause said forward end portions to engage the bale including a hydraulic cylinder and fluid-moved piston therein, a third member secured to said bale-engaging members adjacent their rear ends and pivoted to swing about a substantially horizontal axis stationary relatively to said frame, and means controlled by said second member for swinging said third member and bale-engaging members upwardly to bring said bale to discharging position and for permitting the same to swing downwardly in a reverse direction including a hydraulic cylinder and a fluid-moved piston therein and a source of fluid under pressure connected to said cylinders, said second member being connected to said last mentioned piston and acting to move the same to increase pressure in said second mentioned cylinder whereby said first mentioned piston will act before said second mentioned piston and move said bale-engaging members toward each other at their forward ends to normal position.

3. The structure set forth in claim 1, and resilient means for moving the rear ends of said levers toward each other to cause the forward ends of said levers normally to diverge.

4. A bale-loading device carried by and movable with a vehicle, a frame secured to said vehicle and disposed at one side thereof, a pair of oppositely disposed bale-engaging members at the front of said frame swingable about substantially vertical axes, said members having normally diverging ends forward of said axes and rear ends in the rear of said axes, a second member carrying said members and swingable about a substantially horizontal axis, a cylinder and plunger therein respectively connected to the rear ends of said bale-engaging members, a second cylinder and plunger therein respectively engaging said frame and said second member, a conduit for supplying fluid to said first mentioned cylinder to cause the same and said plunger to move the rear ends of said bale-engaging members apart to cause the forward ends thereof to grasp a bale, and means for then delivering fluid to said second cylinder to cause the plunger thereof to swing said second member and swing said bale-engaging members and bale to discharging position.

5. The structure set forth in claim 4, a member disposed between said bale-engaging members adapted to be engaged by the end of said bale and connected to said second member to swing the same and cause said second mentioned plunger to move in said second mentioned cylinder and place pressure on the fluid therein.

6. The structure set forth in claim 4, a conduit for supplying fluid to one end of said first mentioned cylinder, a conduit for supplying fluid to one end of said last mentioned cylinders, a conduit for supplying fluid under pressure, and a T connection to which said conduits are connected whereby fluid is first delivered to said first mentioned cylinder and when said bale-engaging members engage the sides of said bale and pressure is built up in said first mentioned cylinder, the fluid will flow into said second cylinder and swing said second frame to raise said bale-engaging members and bale.

7. The structure set forth in claim 6, said frame being removable from said vehicle and said conduit having a readily detachable automatically closing coupling thereon whereby said device can be readily removed from said vehicle.

8. A bale-loading device adapted to be carried by and moved by a vehicle having in combination, supporting members secured to said vehicle spaced longitudinally thereof and projecting from one side thereof, a frame supported on said members, an oscillating substantially cylindrical member supported on said frame for oscillation about a substantially horizontal axis, a pair of vertically spaced members disposed forwardly of and below said cylindrical member and connected thereto, a pair of oppositely disposed arms movable between said vertically spaced members and having forwardly projecting normally diverging forward end portions disposed well in front of said frame, said arms being pivoted about substantially vertical axes and having portions extending rearwardly from said axes, resilient means connected to said portions and normally holding the forward ends of said arms in diverging position, hydraulic means connected to the ends of said last mentioned arms for separating the same to cause said first mentioned arms to move together and engage a bale, and hydraulic means for oscillating said cylindrical member to raise said vertically spaced members and arms to swing said bale upwardly to discharging position and for permitting said arms to swing downwardly in a reverse direction to normal position.

9. The structure set forth in claim 8, members secured to said vehicle spaced longitudinally thereof, said supporting members being slidable in said last mentioned members, and means engaging said supporting members and last mentioned members for holding said supporting members in position.

10. The structure set forth in claim 8, spaced pipes secured to said vehicle extending transversely thereof and terminating adjacent one side thereof, said supporting members being slidable and removable from said pipes, and means connecting said supporting members and pipes to hold the former in position.

11. A bale-loading device adapted to be carried by and moved by a vehicle having in combination, a frame disposed at one side of said vehicle and supported on said vehicle, a second frame mounted on said frame and oscillatable about a substantially horizontal axis, a pair of oppositely disposed bale-engaging members carried by said second frame and pivoted to swing about spaced substantially vertical axes, a member disposed between said bale-engaging members and adapted to be engaged by the end of a bale, said member being connected to said second frame, an arm secured to said second frame normally disposed at the rear side thereof, a plunger rod connected to said arm and carrying a plunger, a cylinder in which said plunger is disposed connected at one end to said first mentioned frame, a plunger rod connected to the rear end of one of said bale-engaging members and having a plunger thereon, a cylinder connected to the rear end of the other of said bale-engaging members in which said last mentioned plunger is disposed, a conduit connected adjacent the connected end of said last mentioned cylinder, a conduit connected adjacent the connected end of said first mentioned cylinder, a conduit for supplying fluid under pressure and a coupling connecting all of said conduits whereby when said second member is engaged by a bale, said second frame and arm will be swung to move said plunger in said first mentioned cylinder to place pressure on the fluid therein.

12. A bale-loading device adapted to be carried and moved by a vehicle having in combination, a pair of supports spaced longitudinally of said vehicle and extending transversely thereof, a pair of members carried in said supports and projecting therefrom, a frame carried on said supports having transversely spaced members extending between said supports, a member oscillatable on the forward one of said supports, a pair of vertically spaced members disposed below and forwardly of said last mentioned member and rigidly carried thereby, a pair of transversely spaced bale-engaging members disposed between and movable between said last mentioned members, the same being pivoted about substantially vertical axes and having forward portions in front of said axes and rear portions in the rear of said axes, means normally moving said rear portions together to cause said forward portions normally to diverge, means for moving said rear portions apart to cause said bale-engaging members to engage the sides of a bale, and means for swinging said first mentioned member to swing said bale-engaging member and bale upwardly to discharging position.

13. A bale-loading device adapted to be moved forwardly by a vehicle having in combination, a frame, a substantially horizontal shaft projecting laterally from said vehicle, a sleeve rotatable on said shaft, said shaft being stationary relative to said frame, a pair of elongated bars secured adjacent their rear ends to said sleeve and projecting quite a distance forwardly of said frame in normally diverging relation, said bars being respectively swingable about axes extending at right angles thereto and spaced from the rear ends thereof, resilient means acting to move said rear ends toward each other, and means for swinging the rear ends of said bars about said last mentioned axes to cause the front portions of said bars to grasp a bale, and means for oscillating said sleeve and bars to swing the front ends of said bars and bale upwardly and for permitting said bars to swing downwardly in a reverse direction to normal position.

14. A bale loading device carried by a vehicle having in combination, a frame secured to said vehicle, first means suspended on said frame and oscillatable about a substantially horizontal axis, a pair of vertically spaced horizontally extending members extending transversely of said frame below and forwardly of said first means and secured thereto, a pair of oppositely disposed spaced levers movable between said vertically spaced members and pivoted to said first means, said levers extending in front of said frame, means for swinging the front portions of said levers together to engage a bale and for then pivoting said first means to raise said levers and bale upwardly.

15. A bale loading device adapted to be carried and moved by a vehicle having in combination a frame secured to said vehicle, elongated bale engaging members extending from said frame in normally spaced relation and having outwardly diverging ends swingable through a substantially horizontal direction, means supporting said elongated members at a point intermediate their ends for pivotal movement through said horizontal direction, said members being arranged so as to move into position at either side of a bale, means adapted to be engaged by an end of said bale and actuated thereby, said means being positioned between said elongated bale engaging members and adjacent said means supporting said elongated members in pivotal relation for engagement with said bale when said bale approaches the converging portion of said elongated members, means for moving said bale engaging members to engage said bale and for swinging said bale engaging members upwardly to bring said bale to discharging position including hydraulic cylinder means, and means controlled by said means adapted to be engaged by the end of said bale for sequent control of said hydraulic cylinder means whereby said bale engaging members will be first swung into position to engage the bale and then swung upwardly to bring said bale to discharging position.

16. A bale loading device adapted to be carried and moved by a vehicle having in combination a frame secured to said vehicle, bale engaging members extending from said frame in normally spaced relation and swingable throughout a substantially horizontal direction, said members being arranged so as to move into position at either side of a bale, means adapted to be engaged by an end of said bale and actuated thereby, means for moving said bale engaging members together to engage the bale including a hydraulic cylinder and fluid moved piston therein, means secured to said bale engaging members and pivoted to swing about a substantially horizontal axis stationary relative to said frame, means controlled by said means adapted to be engaged by the end of said bale for swinging said means secured to said bale engaging members and said bale engaging members upwardly to bring said bale to discharging position, and for permitting the same to swing downwardly in a reverse direction including a hydraulic cylinder and fluid moved piston therein, a source of fluid under pressure connected to said cylinders, said means adapted to be engaged by said bale being connected to said last mentioned piston and acting to move the same to increase pressure to said second mentioned cylinder whereby said first mentioned piston will act before said second mentioned piston and move said bale engaging members toward each other.

17. A bale loading device adapted to be carried by a vehicle having in combination a frame secured to said vehicle, means for gripping a bale positioned on said frame, means for elevating a bale positioned on said frame, and means for actuating said bale gripping and bale elevating means, spaced members secured to said vehicle and spaced longitudinally thereof, spaced supporting members for said frame slidable in said last mentioned members and means engaging said supporting members and last mentioned members for holding said supporting members in position.

18. The apparatus of claim 17 further characterized by spaced pipes secured to said vehicle extending transversely thereof and terminating adjacent one side thereof, said supporting members being slidable and removable from said pipes, and means connecting said supporting members and pipes to hold the former in position.

References Cited in the file of this patent

UNITED STATES PATENTS

| Number | Name | Date |
| --- | --- | --- |
| 806,511 | Arnold | Dec. 5, 1905 |
| 871,601 | Lauppe | Nov. 19, 1907 |
| 2,130,057 | Bennett et al. | Sept. 13, 1938 |
| 2,182,838 | Bennett | Dec. 12, 1939 |
| 2,225,787 | McDermott et al. | Dec. 24, 1940 |
| 2,362,749 | Gall et al. | Nov. 14, 1944 |
| 2,367,970 | Smoker | Jan. 23, 1945 |
| 2,403,356 | Francis | July 2, 1946 |
| 2,488,767 | Drott et al. | Nov. 22, 1949 |
| 2,497,118 | Ferrario et al. | Feb. 14, 1950 |
| 2,611,498 | Broersma | Sept. 23, 1952 |

FOREIGN PATENTS

| Number | Country | Date |
| --- | --- | --- |
| 6,344 | Netherlands | Dec. 15, 1921 |
| 702,625 | France | Jan. 26, 1931 |